(12) United States Patent
de Echaniz et al.

(10) Patent No.: US 9,774,755 B1
(45) Date of Patent: Sep. 26, 2017

(54) LIQUID CRYSTAL DOCUMENT HANDLER CVT GLASS

(71) Applicant: Xerox Corporation, Norwalk, CT (US)

(72) Inventors: Sebastian Rodrigo de Echaniz, Middleton (GB); Michael John Wilsher, Letchworth (GB); Paul Simon Golding, Hertford (GB); Benjamin Thomas Thurnell, Cheshunt (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/142,764

(22) Filed: Apr. 29, 2016

(51) Int. Cl.
*H04N 1/04* (2006.01)
*H04N 1/10* (2006.01)
*G02F 1/133* (2006.01)
*G02F 1/137* (2006.01)
*G02F 1/1334* (2006.01)

(52) U.S. Cl.
CPC .......... *H04N 1/1061* (2013.01); *G02F 1/137* (2013.01); *G02F 1/1334* (2013.01); *G02F 1/13306* (2013.01); *H04N 2201/0094* (2013.01)

(58) Field of Classification Search
CPC ....... H04N 2201/03133; H04N 1/1013; H04N 1/00519; H04N 1/193; H04N 2201/0422; H04N 2201/0434; H04N 1/00236; H04N 1/00238; H04N 1/00241; H04N 1/00347; H04N 1/00408; H04N 1/00411; H04N 1/00413
USPC ...... 358/474, 498, 1.13, 462, 483, 486, 497, 358/501, 504
See application file for complete search history.

(56) References Cited

U.S. PATENT DOCUMENTS

| 5,091,654 | A | * | 2/1992 | Coy | ....................... H04N 1/047 250/559.29 |
| 5,414,481 | A | * | 5/1995 | Fujioka | ................ G03B 21/132 353/122 |
| 5,488,464 | A | | 1/1996 | Wenthe, Jr. et al. | |
| 5,764,384 | A | * | 6/1998 | Wilcox | ................ B41J 13/103 271/10.11 |
| 5,796,928 | A | * | 8/1998 | Toyomura | .......... H04N 1/00795 358/1.6 |
| 6,377,339 | B1 | * | 4/2002 | Westerman | ....... G02F 1/134327 349/110 |
| 6,567,188 | B1 | | 5/2003 | Thompson et al. | |
| 6,744,536 | B2 | * | 6/2004 | Buchar | .............. H04N 1/00734 358/449 |
| 7,639,404 | B2 | * | 12/2009 | Ikeno | ................... H04N 1/1017 358/461 |
| 8,187,493 | B2 | | 5/2012 | Duponchel et al. | |

(Continued)

*Primary Examiner* — Negussie Worku
(74) *Attorney, Agent, or Firm* — Gibb & Riley, LLC

(57) ABSTRACT

According to exemplary scanning devices herein, a platen has a sheet side and a scanner side, opposite the sheet side. A scanner is located on the scanner side of the transparent platen. The platen has a constant velocity transport (CVT) scanning position at an end of the platen. A portion of the platen, located at the CVT scanning position of the platen has integral transparent electrodes and incorporates a polymer/liquid crystal filler material that is white in a first state and transparent in a second state. A scanner is located on the scanner side of the platen. A controller is electrically connected to the electrodes. The controller controls the state of the polymer/liquid crystal filler material during scanning of a document and during white calibration of the scanner.

15 Claims, 7 Drawing Sheets

(56) References Cited

U.S. PATENT DOCUMENTS

| | | | |
|---|---|---|---|
| 8,279,497 B2* | 10/2012 | Nakano | H04N 1/00013 358/401 |
| 8,559,065 B2* | 10/2013 | Deamer | H04N 1/125 358/448 |
| 8,581,860 B2 | 11/2013 | Meng | |
| 8,786,914 B1* | 7/2014 | Mui | H04N 1/00002 358/461 |
| 8,947,740 B1* | 2/2015 | Wilsher | H04N 1/0288 347/130 |
| 9,247,077 B2* | 1/2016 | Golding | H04N 1/00087 |
| 9,270,837 B1* | 2/2016 | Whitesell | H04N 1/00087 |
| 2006/0082839 A1 | 4/2006 | Durbin et al. | |
| 2007/0070457 A1* | 3/2007 | Cheng | H04N 1/401 358/504 |
| 2007/0211311 A1 | 9/2007 | Korhonen et al. | |
| 2008/0055674 A1* | 3/2008 | Wilsher | H04N 1/02815 358/488 |
| 2013/0050771 A1* | 2/2013 | Deamer | H04N 1/125 358/448 |
| 2014/0355077 A1 | 12/2014 | Depalov et al. | |
| 2016/0330344 A1* | 11/2016 | Wilsher | H04N 1/1065 |

* cited by examiner

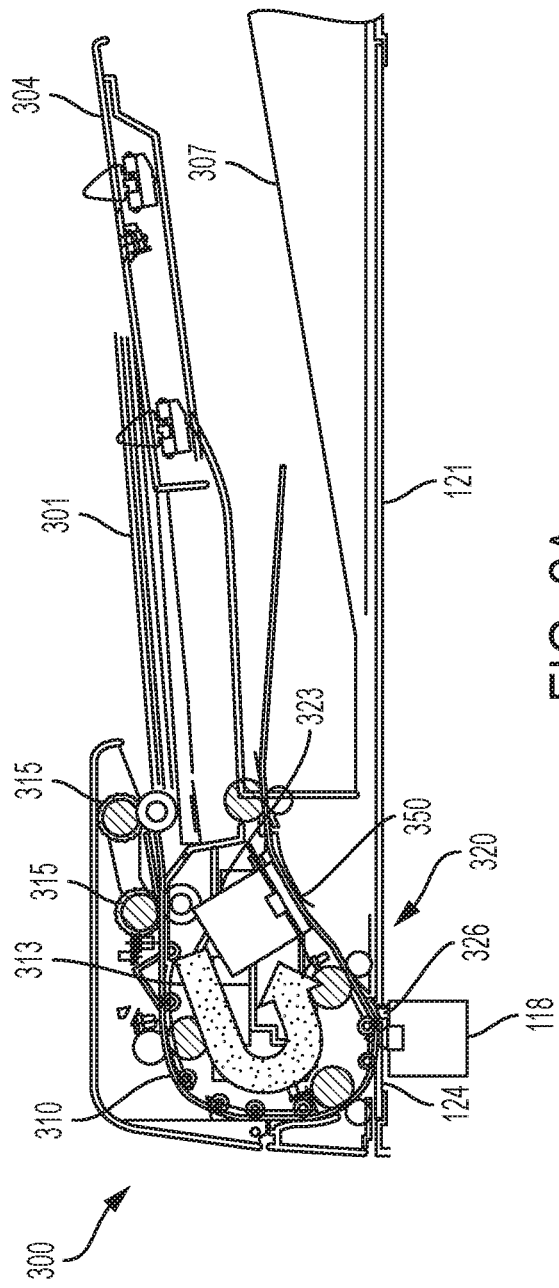
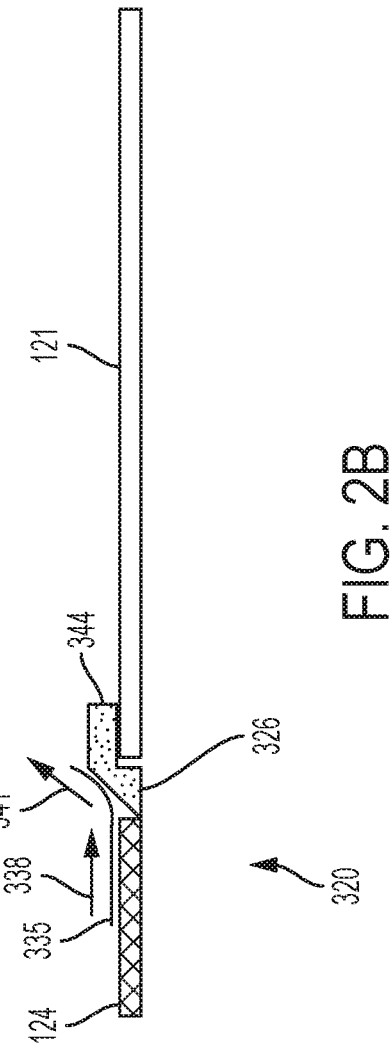
FIG. 2A
FIG. 2B

LIQUID CRYSTAL DOCUMENT HANDLER CVT GLASS

BACKGROUND

Devices and methods herein generally relate to multifunction machines having document scanners such as printers, copiers, and/or multifunction devices and, more particularly, to platens using electrochromic windows for calibration of the scanner.

Generally, a document scanner converts images and/or text on a hardcopy of a document into electronic form. The document scanning process involves placing the document on a top surface of a transparent platen (e.g., a flat glass plate). A scanner carriage is then moved past the document along the bottom surface of the platen. The scanner carriage includes a light source that illuminates the document and, particularly, the images and/or text thereon. The carriage also includes an image sensor, which incorporates photosensitive devices (e.g., photodiodes or other photosensitive devices) that measure the intensity of light reflected from given areas of the document. The sensor data is then translated from analog to digital, thereby defining the picture elements (i.e., pixels) of the document being scanned. Combined, these pixels represent the document in electronic form.

Another example of a document scanning process involves a constant velocity transport (CVT) scanning system in which the document moves and the scanner carriage is stationary. In the CVT scanning system, a single stationary scanning system is utilized to scan the entire document while the document is moved past the scanning system. The CVT scanning system, conventionally, includes an image sensor, such as Contact Image Sensors (CIS) and CCD array systems, and a light source. As in the platen scanning system, the image sensor receives light reflected from the document and converts the light into electrical signals representing the intensity of the received light. The electrical signals are then passed on to an electronic subsystem which performs the necessary image processing operation so as to prepare the image data either for display on a display devices such as a CRT/LCD, for storage by a storage device such as a CD-ROM/Flash/Hard Drive etc., or for recording or printing on a medium, such as a document, in a similar manner as described above.

In current implementations of devices, such as printers, copiers, and fax machines, the scanner white reference is calibrated by moving the scanner head relative to a white calibration strip, or conversely, moving the calibration area relative to the scanning point. In either case, the scanning is performed through a clear glass area.

SUMMARY

In one aspect of the devices and methods disclosed herein, a CVT glass using Polymer Dispersed Liquid Crystal (PDLC) that is normally white when de-activated can be used for white calibration, without the need to create an additional calibration area to move the scanner head over. The PDLC in the CVT glass becomes transparent when activated in order to enable document scanning.

According to an exemplary scanner disclosed herein, a platen has a sheet side and a scanner side, opposite the sheet side. The platen has a constant velocity transport (CVT) scanning position at an end of the platen. A portion of the platen, located at the CVT scanning position of the platen, has integral transparent electrodes and incorporates a polymer/liquid crystal filler material that is white in a first state and transparent in a second state. An automatic document feeder (ADF) feeds documents to the CVT scanning position. A scan sensor is movably positioned on the scanner side of the platen. The scanner includes a controller electrically connected to the electrodes. The controller provides energy to the electrodes for changing the state of the polymer/liquid crystal filler material. The polymer/liquid crystal filler material is in the second state during scanning of a document from the ADF. The polymer/liquid crystal filler material is in the first state during white calibration of the scan sensor. The scan sensor scans a bottom surface of the platen at the CVT scanning position in order to calibrate the scan sensor.

According to exemplary scanning devices herein, a platen has a sheet side and a scanner side, opposite the sheet side. A scanner is located on the scanner side of the transparent platen. The platen has a constant velocity transport (CVT) scanning position at an end of the platen. A portion of the platen, located at the CVT scanning position of the platen has integral transparent electrodes and incorporates a polymer/liquid crystal filler material that is white in a first state and transparent in a second state. A scanner is located on the scanner side of the platen. A controller is electrically connected to the electrodes. The controller controls the state of the polymer/liquid crystal filler material during scanning of a document and during white calibration of the scanner.

According to an exemplary method of calibrating a document scanner herein, a platen is provided. A portion of the platen is located directly above the document scanner. The portion of the platen located directly above the document scanner incorporates a polymer/liquid crystal filler material that is white in a first state and is transparent in a second state. With the portion of the platen incorporating the polymer/liquid crystal filler material in the first state, a bottom surface of the platen is scanned. White calibration data is created based on the scanning of the bottom surface of the platen. Stored calibration values are adjusted for the document scanner using the white calibration data.

These and other features are described in, or are apparent from, the following detailed description.

BRIEF DESCRIPTION OF THE DRAWINGS

Various examples of the devices and methods are described in detail below, with reference to the attached drawing figures, which are not necessarily drawn to scale and in which:

FIG. 2A is a side-view schematic diagram of an automatic document handler according to devices and methods herein;

FIG. 2B is a side-view of a platen according to devices and methods herein;

DETAILED DESCRIPTION

Figure 1:
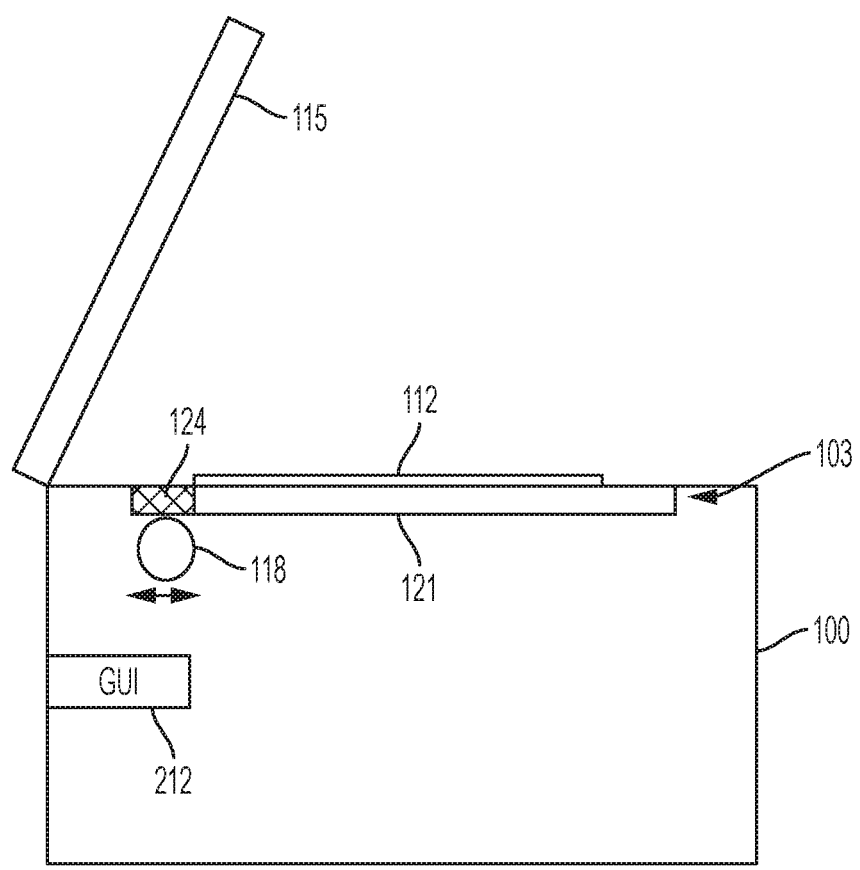
FIG. 1 is a side-view schematic diagram illustrating scanning devices herein.

The disclosure will now be described by reference to a multi-function device that includes an automatic document handler and a scanner. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

As shown in FIG. 1, one exemplary scanner 100 herein includes a transparent platen 103. The platen 103 may be covered by a closable lid or cover 115 (which can include a document handler or automatic document feeder (ADF) in some devices, as discussed below).

An optical detector 118 (scanner) is positioned adjacent the transparent platen 103 in a position to optically scan the items 112, such as a sheet of paper, positioned on the transparent platen 103 for scanning. For example, the optical detector 118 can move in the direction indicated by the double arrow line in the drawings when scanning items that are positioned on the platen 103. The optical detector 118 is generally positioned at a home position (at one extreme end of the platen 103) when not scanning. According to devices and methods herein, the platen 103 may comprise two portions: a transparent scanner glass 121 and a CVT glass 124. The CVT glass 124 is located directly above the optical detector 118 at the home position. Note FIG. 1 also illustrates a graphic user interface (GUI) 212 that can be included as part of the scanner 100.

FIG. 2A shows an enlarged schematic view of a document handler 300 incorporated in the cover 115 shown in FIG. 1. Original documents 301 are fed from the first tray 304 to the second tray 307 following a paper path 310 in a substantially counter-clockwise direction, indicated by arrow 313. The document handler 300 may include one or more drive rollers, such as 315, feeding the original documents 301 in a process direction from the first tray 304 to the second tray 307. Also, as further illustrated in FIG. 2B, the scanner 100 includes a constant velocity transport (CVT) scanning station 320 that has a CVT glass 124 and CVT ramp 326. The CVT scanning station 320 is positioned after the drive roller 315 in the process direction 313. The optical detector 118 may remain stationary in the CVT scanning station 320 during operation of the document handler 125. In some cases, a document 301 may be placed directly on the scanner glass 121. When a document is placed directly on the scanner glass 121, the optical detector 118 is then moved past the document along the bottom surface of the scanner glass 121.

In the case of a single pass version of a document handler 300, a second fixed scanner 323 may be provided inside the document handler 300. The second fixed scanner 323 is positioned to scan the second side of an original document 301.

Figure 2C:
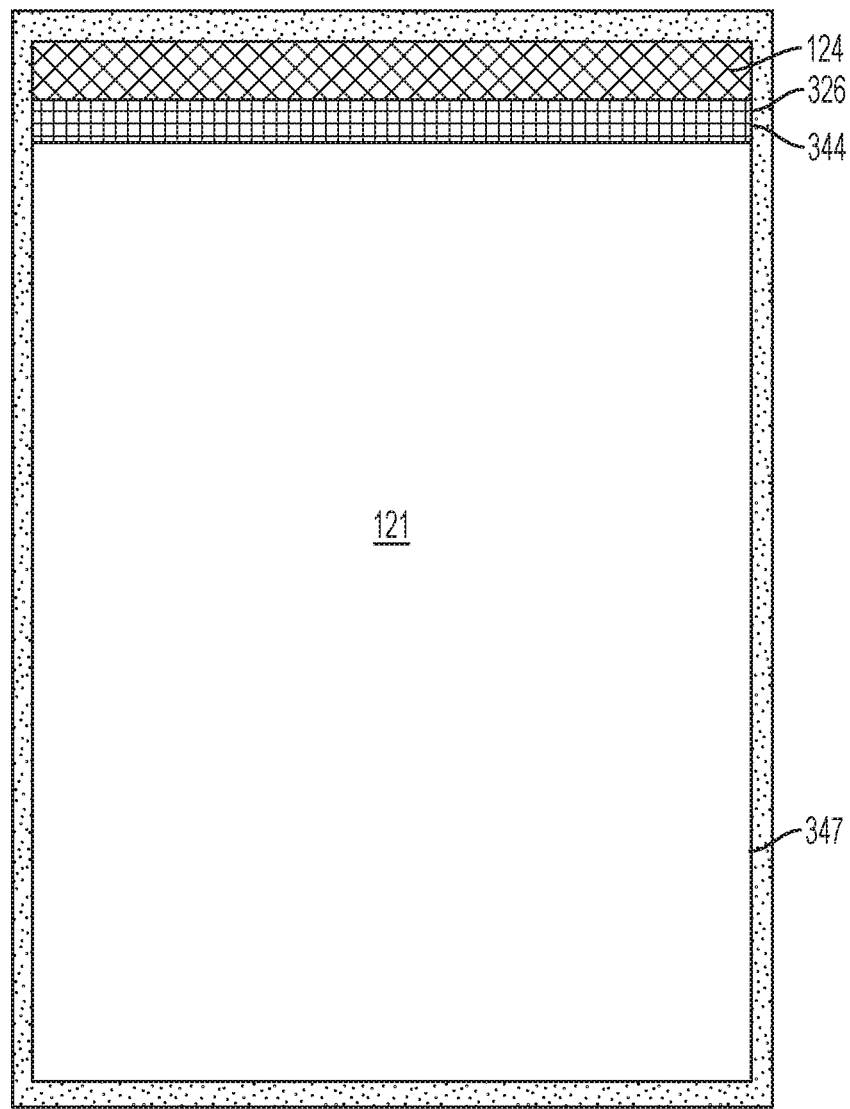
FIG. 2C is a plan view of a platen according to devices and methods herein.

Referring to FIGS. 2B and 2C, a typical configuration requires two independent pieces of glass i.e., the CVT glass 124 and the scanner glass 121, having the CVT ramp 326 between them. The CVT ramp 326 may be slightly concave toward the CVT glass 124. The CVT ramp 326 directs the paper path from the CVT scanning station 320 toward the second tray 307. That is, the scan document 335 runs along the CVT glass 124, as indicated by arrow 338, to be scanned. The scan document 335 is picked up off the CVT glass 124 by the CVT ramp 326, as indicated by arrow 341. In a typical configuration, the CVT ramp 326 initiates below the CVT glass 124 to prevent stubbing of the scan document 335. Additionally, in a typical configuration, a registration strip 344 is positioned at the end of the scanner glass 121 in order to align the paper when placed directly on the scanner glass 121. The CVT glass 124, CVT ramp 326, registration strip 344, and scanner glass 121 may be disposed in a frame 347, as shown in FIG. 2C.

This configuration uses two independent pieces of glass so that the CVT ramp 326 can be fitted below the CVT glass 124 to prevent stubbing of the paper. As shown in FIGS. 2B and 2C, the CVT glass 124 is typically approximately 25 mm wide and the CVT ramp 326 combined with the registration strip 344 is typically approximately 20 mm wide. The scanner glass 121 has to be a little wider than approximately 435 mm in order to be able to scan this size. Moreover, the entire scanning surface within the frame 347 needs approximately 45 mm additional more space than the width of the scanner glass 121 to accommodate the CVT glass 124 and the CVT ramp 326. However, different sizes for use with, for example, 8.5"×11" platens, are equally applicable.

Figure 3:
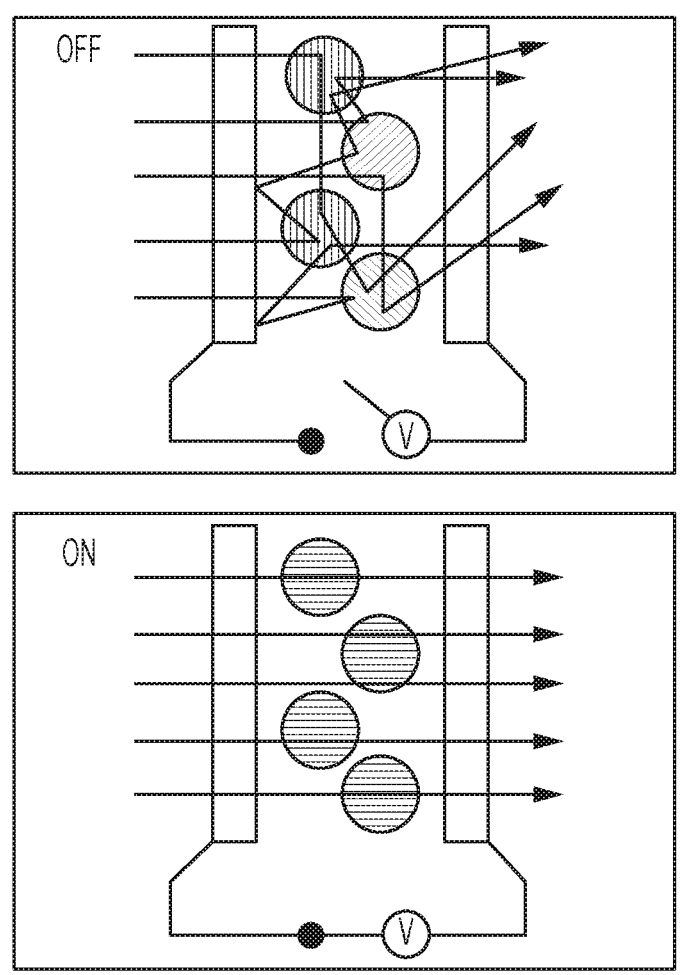
FIG. 3 is an illustration of an electrochromic effect according to devices and methods herein.

Current systems scan against a glass platen that has a calibration strip on part of the glass. Typically, the sensor of the optical detector 118 is calibrated by moving the optical detector 118 under a white calibration strip, which is separate from the glass. Conversely, the optical detector 118 can be calibrated by moving at least part of the glass. For example, the internal CVT glass 350 associated with the second fixed scanner 323 may be moveable to a position over the scanning point. In such a case, the internal CVT glass 350 would have a calibration strip on part of the glass. The calibration strip and mechanisms for moving the internal CVT glass 350 take up extra space inside the scanner. According to devices and methods herein, the CVT glass 124 or internal CVT glass 350 is constructed using a polymer/liquid crystal filler. A polymer/liquid crystal filler contains liquid crystal material filling the voids in a solid (although possibly flexible) polymer matrix. Although several such fillers are applicable to the invention, they all share several common optical properties. Referring to FIG. 3, one type of filler that is applicable to the present invention comprises polymer-dispersed liquid crystals (PDLCs). PDLCs contain liquid crystal droplets (with sizes preferably on the order of one to a few microns) dispersed in a solid polymer matrix. The refractive index of the droplets is anisotropic, i.e., the index parallel to the director is significantly different from the index perpendicular to the director. Preferably, the index of refraction for the polymer matrix is closely matched to the index of refraction for the liquid crystal droplets measured parallel to their directors. Normally, in a first state, the directors of the droplets take on random orientations, such that polymer/liquid crystal interfaces with a variety of indices of refraction are presented to an incoming light wave. Thus, in a first state, such as when not activated, the PDLC film scatters light, making the film appear opaque. In a second state, such as when the PDLC film is placed under an electric field, however, the directors tend to align with the field. The index of refraction for the aligned droplets matches the index for the polymer matrix, such that light propagating parallel to the field may then pass through the field with little scattering, making the film appear transparent. In other words, when the power is OFF, as shown in the top schematic of FIG. 3, the liquid crystal droplets are arranged in an irregular manner, dispersing light and making the CVT glass 124 opaque. When the power is ON, as shown in the bottom schematic of FIG. 3, the liquid crystal droplets are arranged in a regular manner, allowing light to pass uninterrupted and making the CVT glass 124 transparent.

Figure 4A:
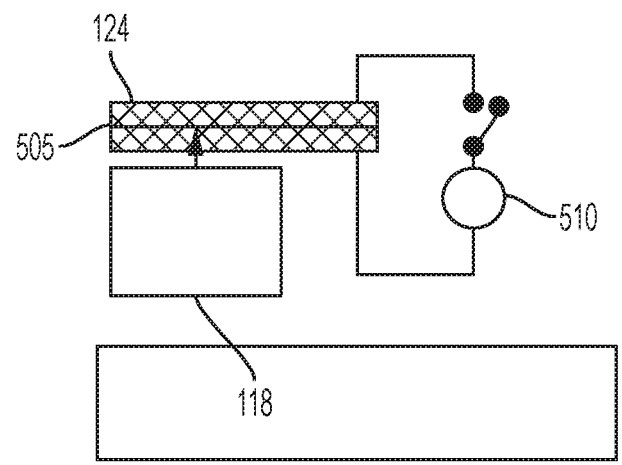
FIG. 4A is a side-view of a portion of a platen using an electrochromic window according to devices and methods herein.
Figure 4B:
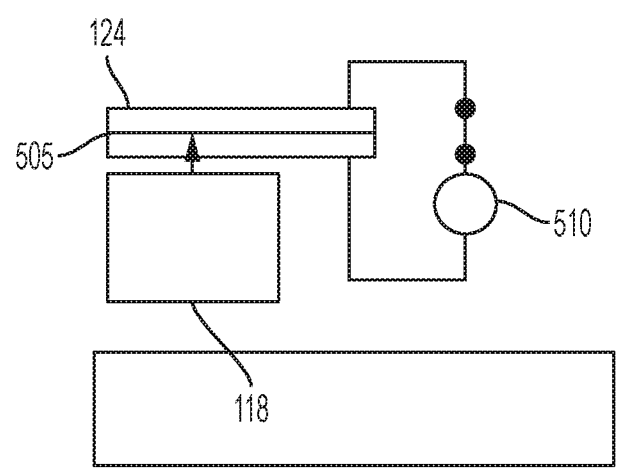
FIG. 4B is a side-view of a portion of a platen using an electrochromic window according to devices and methods herein.

FIG. 4A shows a CVT glass 124 or an internal CVT glass 350 comprising a laminated glass product consisting of a Polymer Dispersed Liquid Crystal (PDLC) film 505 sandwiched between two layers of glass or plastic and two conductive interlayers. This PDLC film 505 allows a change in visual appearance of the glass from opaque (white), as shown in FIG. 4A, to clear (transparent), as shown in FIG. 4B. That is, when electricity from an electrical power source 510, such as a low electric field, is applied to the film, as shown in FIG. 4B, the liquid crystals line up, changing the glass from opaque to clear. Conversely, when electricity from the electrical power source 510 is removed, the liquid crystals return to their normal scattered positions changing the CVT glass 124 back to opaque, as shown in FIG. 4A. It should be noted that other constructions in which the PDLC is normally transparent and that require energizing the PDLC to make it opaque are also envisaged.

The CVT glass 124 or internal CVT glass 350 will be in its opaque state most of the time, and electricity 510 is applied to make it transparent for scanning. While in its opaque state, the CVT glass 124 has a white color, allowing for in situ white calibration without the need to move the scanner head or the CVT glass 124 or the internal CVT glass 350 to another position. The lack of movement saves time before the scan and reduces the first copy out time. It also saves space and reduces complexity, as there is no need for a separate calibration strip and the mechanism to move it would have less travel.

Figure 5:
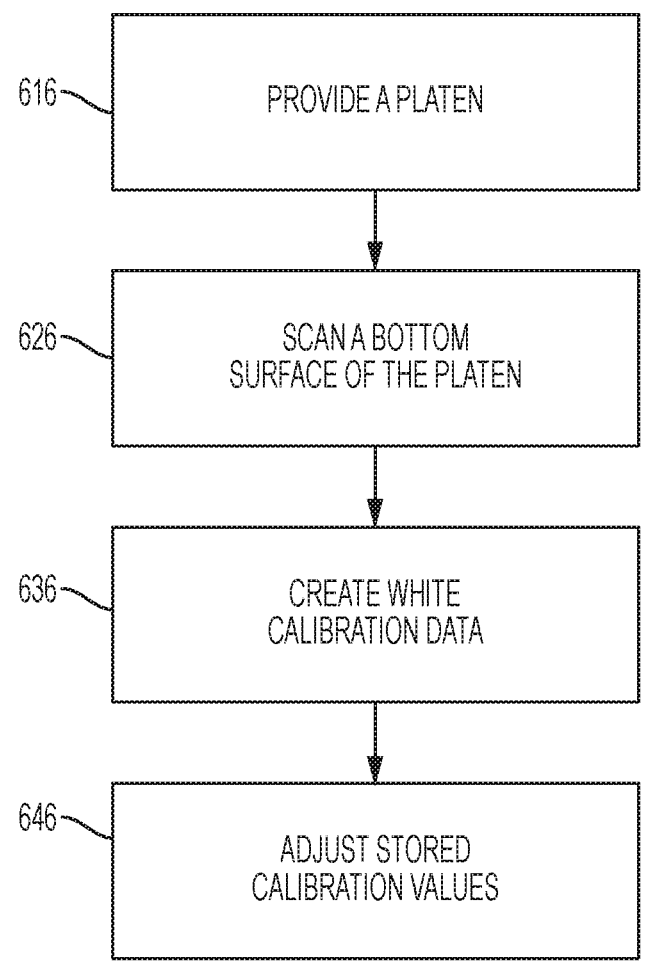
FIG. 5 is a flow diagram illustrating methods herein.

FIG. 5 is a flow diagram illustrating the processing flow of an exemplary method according to the present disclosure. The method is useful for calibrating a document scanner. At 616, a platen is provided. A portion of the platen is located directly above the document scanner. The portion of the platen located directly above the document scanner incorporates a polymer/liquid crystal filler material that is white in a de-activated state and is transparent in an activated state. In some cases, the portion of the platen located directly above the document scanner may be a separate CVT glass. A bottom surface of the platen is scanned, at 626. The scanning is performed prior to activating the portion of the platen incorporating the polymer/liquid crystal filler material, and without moving the scanner. White calibration data is created based on the scanning of the bottom surface of the platen, at 636. At 646, stored calibration values are adjusted for the document scanner using the white calibration data.

Figure 6:
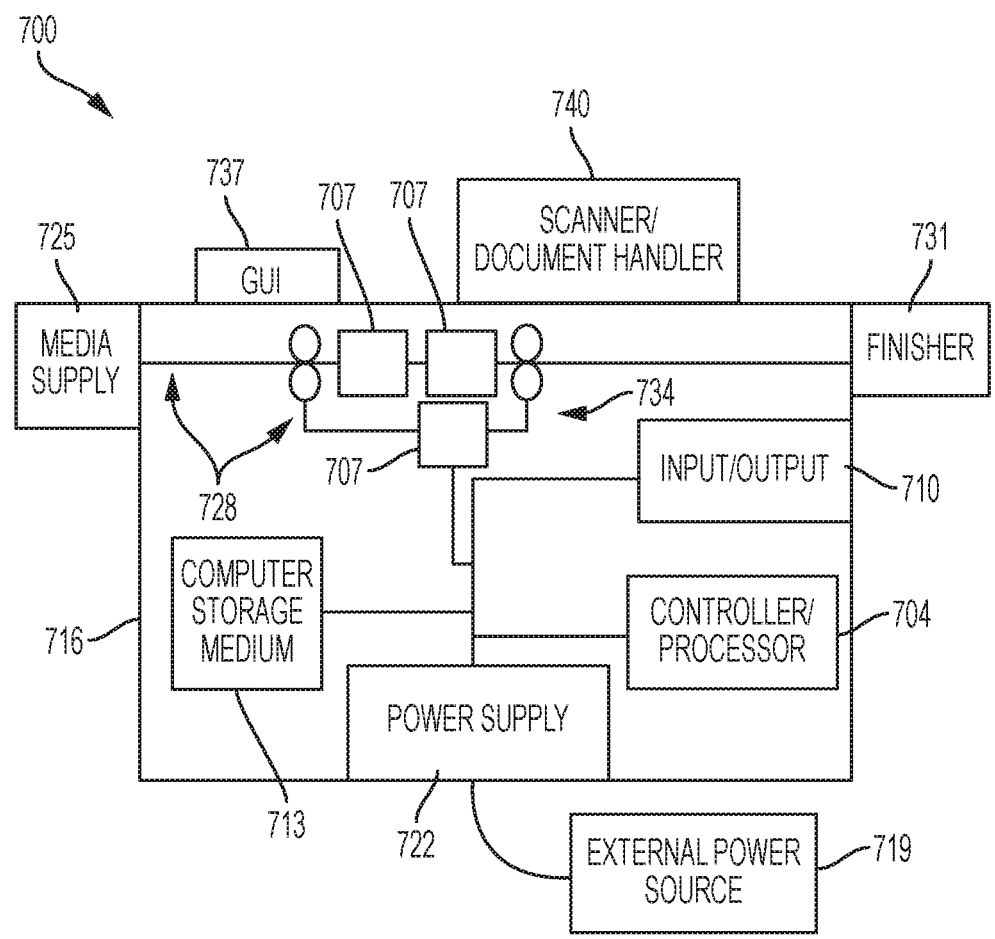
FIG. 6 is a side-view schematic diagram of a multi-function device according to devices and methods herein.

Referring to the FIG. 6, a multi-function device (MFD) 700 is shown, which can be used with devices and methods herein. The multi-function device (MFD) 700 can comprise, for example, a printer, copier, a multi-function machine, etc. The MFD 700 includes a controller/processor 704 and at least one marking device (print engine(s)) 707 operatively connected to the controller/processor 704. The MFD 700 may also include a communications port (Input/Output device 710) operatively connected to the controller/processor 704 and to a computerized network external to the MFD 700. The Input/Output device 710 may be used for communications to and from the MFD 700.

Further, the marking device 707 is any device capable of rendering an image. The set of marking devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

The controller/processor 704 controls the various actions of the MFD 700, as described below. A non-transitory computer storage medium device 713 (which can be optical, magnetic, capacitor based, etc.) is readable by the controller/processor 704 and stores instructions that the controller/processor 704 executes to allow the MFD 700 to perform its various functions, such as those described herein.

According to systems and methods herein, the controller/processor 704 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the MFD 700 is special purpose machine that includes a specialized image processing card having unique ASICs for providing clear image processing, includes specialized boards having unique ASICs for input and output devices to speed network communications processing, a specialized ASIC processor that performs the logic of the methods described herein using dedicated unique hardware logic circuits, etc. It is contemplated that the controller/processor 704 may comprise a raster image processor (RIP). A raster image processer uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 6, a body housing 716 has one or more functional components that operate on power supplied from an external power source 719, which may comprise an alternating current (AC) power source, through the power supply 722. The power supply 722 can comprise a power storage element (e.g., a battery) and connects to the external power source 719. The power supply 722 converts the power from the external power source 719 into the type of power needed by the various components of the MFD 700.

The multi-function device 700 herein has a media supply 725 supplying media to a media path 728. The media path 728 can comprise any combination of belts, rollers, nips, drive wheels, vacuum devices, air devices, etc. The print engine 707 is positioned along the media path 728. That is, the multi-function device 700 comprises a document-processing device having the print engine 707. The print engine 707 prints marks on the media. After receiving various markings from the print engine(s) 707, the sheets of media can optionally pass to a finisher 731 which can fold, staple, sort, etc., the various printed sheets. As described herein, a return paper path 734 may deliver the printed sheets to the same or different print engine 707 for at least a second layer of toner to be applied. Each return of the media to the print engine 707 is referred to herein as a "pass".

In addition, the multi-function device 700 can include at least one accessory functional component, such as a graphic user interface (GUI) assembly 737 or other accessory functional component (such as a scanner/document handler 740, automatic document feeder (ADF), etc.) that operate on the power supplied from the external power source 719 (through the power supply 722). As described above, the scanner/document handler 740 may include a platen, a portion of which comprises a laminated glass product consisting of a Polymer Dispersed Liquid Crystal (PDLC) film sandwiched between two layers of glass or plastic and two conductive interlayers. The controller/processor 704 applies a low voltage electric field to the PDLC film, which changes the portion of the platen from opaque to clear, during scanning operations.

As would be understood by those ordinarily skilled in the art, the multi-function device 700 shown in FIG. 6 is only one example and the systems and methods herein are equally applicable to other types of devices that may include fewer components or more components. For example, while a limited number of print engines and media paths are illustrated in FIG. 6, those ordinarily skilled in the art would understand that many more paper paths and additional print engines could be included within any device used with embodiments herein.

Thus, an image input device is any device capable of obtaining pixel values from an image, which may include a color image having color pixel values. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

Printing devices, such as shown in FIG. 6, are typically full featured. Various ones of the features provide one or more functions to be performed on a job. For example, a job may include capturing an image at the image input section for storage. The image may undergo a significant amount of image processing allowing for the minimization of image related artifacts and various electronic pages may be edited after the job has been suitably stored. After outputting of the stored job, a host of finishing operations, such as stapling, folding, and trimming may be performed on the hardcopy version of the job to optimize its appearance.

As would be understood by those ordinarily skilled in the art, the MFD 700 shown in FIG. 6 is only one example, and the devices and methods herein are equally applicable to other types of printing devices that may include fewer components or more components. For example, while a limited number of printing engines and paper paths are illustrated in FIG. 6, those ordinarily skilled in the art would understand that many more paper paths and additional printing engines could be included within any printing device used with devices and methods herein.

In other words, an exemplary imaging system comprises a multifunctional device with print, copy, scan, and fax services. Such multifunctional devices are well known in the art and may comprise print engines based upon liquid or solid ink jet, electrophotography, other electrostatographic technologies, and other imaging technologies. The general principles of imaging are well known to many skilled in the art and are described above as an example of an imaging system to which the present concepts is applicable.

It should be understood that the controller/processor 704 as used herein comprises a computerized device adapted to perform (i.e., programmed to perform, configured to perform, etc.) the below described system operations. According to devices and methods herein, the controller/processor 704 comprises a programmable, self-contained, dedicated mini-computer having a central processor unit (CPU). Computerized devices that include chip-based central processing units (CPU's) are well-known and readily available devices produced by manufacturers such as Dell Computers, Round Rock Tex., USA, and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such computerized devices are not discussed herein for purposes of brevity and reader focus.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intended for the claims presented below to be limited by the attached drawings, but instead the attached drawings are merely provided to illustrate a few ways in which the claimed features can be implemented.

The term 'printer', 'printing device', 'reproduction apparatus', or 'imaging apparatus' as used herein broadly encompasses any apparatus, such as various printers, copiers, or multifunction machines or systems and may include a digital copier, bookmaking machine, facsimile machine, multifunction machine, etc., which performs a print outputting function, such as xerographic, lithographic, inkjet, or otherwise, for any purpose, unless otherwise defined in a claim. The term 'sheet' or 'substrate' herein refers to any flimsy physical sheet of paper, plastic, or other useable physical substrate for printing images thereon, whether precut or initially web fed. The details of printers, printing engines, etc., are well known by those ordinarily skilled in the art and are not described in detail herein to keep this disclosure focused on the salient features presented. The devices and methods herein can encompass devices that print in color, monochrome, or handle color or monochrome image data. All foregoing devices and methods are specifically applicable to electrostatographic and/or xerographic machines and/or processes.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises", "comprising", and/or "including", when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

What is claimed is:

1. A scanner, comprising:
   a platen having a sheet side and a scanner side, opposite said sheet side, said platen having a scanning position at an end of said platen, a portion of said platen located at said scanning position of said platen having integral transparent electrodes and incorporating a polymer/liquid crystal filler material being opaque in a first state and being transparent in a second state, said first state and said second state being produced by application or removal of an electrical field to said polymer/liquid crystal filler material using said transparent electrodes, said polymer/liquid crystal filler material being white in said first state;
   an automatic document feeder (ADF) feeding documents to said scanning position;
   a scan sensor movably positioned on said scanner side of said platen; and
   a controller electrically connected to said transparent electrodes, said controller controlling application or removal of said electrical field to said transparent electrodes to change the state of said polymer/liquid crystal filler material, said polymer/liquid crystal filler material being in said second state during scanning of a document from said ADF and said polymer/liquid crystal filler material being in said first state during white calibration of said scan sensor, said scan sensor scanning a bottom surface of said platen at said scanning position to calibrate said scan sensor, said scan sensor creating white calibration data based on said scanning said bottom surface of said platen at said scanning position, and said controller adjusting stored calibration values for said scan sensor using said white calibration data.

2. The scanner according to claim 1, said portion of said platen located at said scanning position further comprising a separate glass.

3. The scanner according to claim 1, further comprising:
   a second scan sensor located inside said automatic document feeder; and
   an internal glass located inside said automatic document feeder, said internal glass having integral transparent electrodes and incorporating a polymer/liquid crystal filler material being white in a first state and being transparent in a second state,
   said controller providing energy to said electrodes for changing the state of said polymer/liquid crystal filler material in said internal glass, said polymer/liquid crystal filler material being in said second state during scanning of a document from said ADF and said polymer/liquid crystal filler material being in said first state during white calibration of said second scan sensor, said second scan sensor scanning a top surface of said internal glass to calibrate said second scan sensor.

4. The scanner according to claim 3, said second scan sensor creating white calibration data based on said scanning said top surface of said internal glass.

5. The scanner according to claim 4, said controller adjusting stored calibration values for said second scan sensor using said white calibration data.

6. A scanning device, comprising:
   a platen having a sheet side and a scanner side, opposite said sheet side, said platen having a constant velocity transport (CVT) scanning position at an end of said platen, a portion of said platen located at said CVT scanning position of said platen having integral transparent electrodes and incorporating a polymer/liquid crystal filler material being opaque in a first state and being transparent in a second state, said first state and said second state being produced by application or removal of an electrical field to said polymer/liquid crystal filler material using said transparent electrodes, said polymer/liquid crystal filler material being white in said first state;
   a scanner located on said scanner side of said platen; and
   a controller electrically connected to said transparent electrodes, said controller controlling the state of said polymer/liquid crystal filler material during scanning of a document and during white calibration of said scanner by application or removal of said electrical field to said transparent electrodes,
   said scanner scanning a bottom surface of said platen at said CVT scanning position, said polymer/liquid crystal filler material being in said first state, said scanner creating white calibration data based on said scanning said bottom surface of said platen at said CVT scanning position, and said controller adjusting stored calibration values for said scanner using said white calibration data.

7. The scanning device according to claim 6, said portion of said platen located at said CVT scanning position further comprising a separate CVT glass.

8. The scanning device according to claim 7, said CVT glass comprising a laminated glass product comprising a Polymer Dispersed Liquid Crystal (PDLC) film sandwiched between two layers of glass or plastic and two conductive interlayers.

9. The scanning device according to claim 6, further comprising:

an automatic document feeder (ADF) feeding documents to said CVT scanning position.

10. The scanning device according to claim 9, further comprising:

a second scan sensor located inside said automatic document feeder; and an internal CVT glass located inside said automatic document feeder, said internal CVT glass having integral transparent electrodes and incorporating a polymer/liquid crystal filler material being white in a first state and being transparent in a second state, said controller providing energy to said electrodes for changing the state of said polymer/liquid crystal filler material in said internal CVT glass, said polymer/liquid crystal filler material being in said second state during scanning of a document from said ADF and said polymer/liquid crystal filler material being in said first state during white calibration of said second scan sensor, said second scan sensor scanning a top surface of said internal CVT glass to calibrate said second scan sensor.

11. The scanning device according to claim 10, said second scan sensor creating white calibration data based on said scanning said top surface of said internal CVT glass.

12. The scanning device according to claim 11, said controller adjusting stored calibration values for said second scan sensor using said white calibration data.

13. A method of calibrating a document scanner, comprising:

providing a platen, a portion of said platen located directly above said document scanner said platen incorporating a polymer/liquid crystal filler material being opaque in a first state and being transparent in a second state, said first state and said second state being produced by application or removal of an electrical field to said polymer/liquid crystal filler material, said polymer/liquid crystal filler material being white in said first state;

with said portion of said platen incorporating said polymer/liquid crystal filler material in said first state, scanning a bottom surface of said platen, with said document scanner;

creating white calibration data for said document scanner based on said scanning of said bottom surface of said platen; and adjusting stored calibration values for said document scanner using said white calibration data.

14. The method according to claim 13, said portion of said platen located directly above said document scanner further comprising a separate glass piece.

15. The method according to claim 13, said platen having a sheet side and a scanner side, opposite said sheet side, said document scanner being movably mounted within a frame adjacent to said scanner side of said platen.

* * * * *